United States Patent [19]

Feyen

[11] Patent Number: 5,064,170

[45] Date of Patent: Nov. 12, 1991

[54] SPRAYER SHUTOFF VALVE

[75] Inventor: Robert G. Feyen, Grand Rapids, Mich.

[73] Assignee: Root-Lowell Corporation, Lowell, Mich.

[21] Appl. No.: 699,777

[22] Filed: May 14, 1991

[51] Int. Cl.[5] .......... F16K 31/00; F16K 35/00

[52] U.S. Cl. .......... 251/344; 251/95; 251/111; 251/263

[58] Field of Search .......... 251/343, 344, 95, 111, 251/263; 239/583

[56] References Cited

U.S. PATENT DOCUMENTS

| | | | |
|---|---|---|---|
| 1,611,241 | 12/1926 | Sanford . | |
| 1,677,446 | 7/1928 | Hartmetz . | |
| 1,757,473 | 5/1930 | Pieper . | |
| 1,797,282 | 3/1931 | Bentley . | |
| 2,171,292 | 8/1939 | Pieper | 128/224 |
| 2,369,356 | 2/1945 | Koehn | 251/115 |
| 2,457,993 | 1/1949 | Fletcher et al. | 251/134 |
| 2,622,841 | 12/1952 | Held | 251/132 |
| 2,731,034 | 1/1956 | Dinkelkamp | 251/111 |
| 2,758,873 | 8/1956 | Leisenring | 299/118 |
| 2,939,675 | 6/1960 | Karden | 251/242 |
| 2,969,809 | 1/1961 | Klinger | 137/625.3 |
| 3,075,538 | 1/1963 | Stafford | 251/344 |
| 3,140,830 | 7/1964 | Ingold | 239/583 |
| 3,321,178 | 5/1967 | Pinke et al. | 251/347 |
| 4,128,209 | 12/1978 | Johnson | 239/583 |
| 4,260,130 | 4/1981 | Brehm | 251/113 |
| 4,544,133 | 10/1985 | Collins | 251/344 |
| 4,545,533 | 10/1985 | Botnick | 239/282 |
| 4,635,856 | 1/1987 | Reed | 239/583 |

*Primary Examiner*—A. Michael Chambers

*Attorney, Agent, or Firm*—Price, Heneveld, Cooper, DeWitt & Litton

[57] ABSTRACT

A lockable sprayer shutoff valve has a housing and an upstream hose insert which is slip-fit into the upstream end of a slidably mounted valve sleeve. An O-ring seal is provided between the hose insert and the valve sleeve. The downstream end of the valve sleeve is slip-fit with an O-ring seal over the upstream end of a tubular wand sleeve supported in the downstream end of the housing. A valve plug is generally centered in the valve sleeve for sealing contact with the downstream end of the hose insert when the valve sleeve is in a closed position. When the valve is in the open position fluid is allowed to flow through the hose insert, around the valve plug through slot openings which circumscribe the plug, through the valve sleeve and through the wand sleeve. At least one locking finger is provided on the valve housing. The locking finger can be positioned to interfere with the sliding movement of the valve sleeve and thereby lock the valve sleeve in either the open or closed position.

21 Claims, 3 Drawing Sheets

SPRAYER SHUTOFF VALVE

BACKGROUND OF THE INVENTION

The present invention relates to a shutoff valve for use with a tank-type, portable, pressurized sprayer assembly. For example, in the usual garden-type sprayer, a tank is used to contain an aqueous solution of fertilizer or insecticide. The tank is pressurized by either being connected to a water inlet causing pressure to build in the tank by trapping air or a hand pump is used to pressurize the tank. The valve is usually connected to a flexible hose which leads to a dispensing wand having an adjustable nozzle on the end for providing various spray patterns and even a single stream of liquid.

It has not been uncommon in the past for the valves to leak, particularly when the tank is pressurized and the handle of the valve is actuated frequently turning the liquid stream on and off. When the liquid from the tank leaks, fertilizer and/or insecticide comes into contact with the hand of the gardener possibly presenting a potential health hazard or certainly causing concern on the part of the user.

SUMMARY OF THE INVENTION

In the shutoff valve of the present invention, an upstream input member and a spaced downstream outlet member are supported in a housing with a valve sleeve slidably mounted on the input and outlet members. A valve plug is supported in the valve sleeve and the valve sleeve is movable such that the valve plug can be moved into position closing the input member or into a position spaced from and thereby opening the input member to allow fluid to flow through the input member, through the valve sleeve, past the plug and out through the outlet member.

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
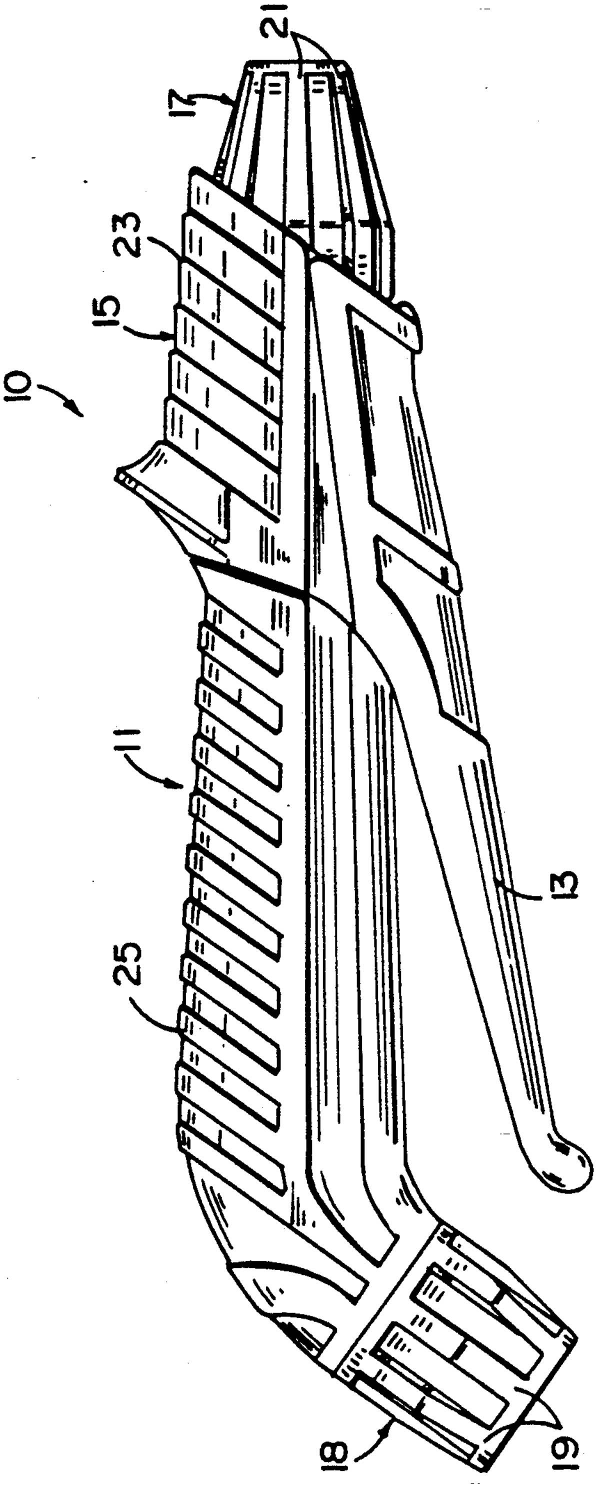
FIG. 1 is an elevational view showing the shutoff valve of the present invention.

Referring to FIG. 1, the shutoff valve of the present invention is shown and indicated generally by the number 10. The valve has a housing 11, an actuating handle 13, a locking member or lock piece 15, an extension nut 17 for holding a dispensing wand in place in the valve assembly, and a hose nut 18 which serves to fasten the two sides of the housing together.

The parts for the shutoff valve assembly are all made of plastic or polymeric materials and are fabricated through conventional molding techniques. Suitable polymeric materials are polyethylene, polypropylene, polycarbonate and ABS plastics. The several parts making up the valve assembly can be colored by mixing suitable pigments into the polymeric material before the part is formed. To protect each part from the effects of ultraviolet radiation, a stabilizer can be added to the plastic material prior to the molding process.

An important consideration in the design of the valve was to be able to use commodity plastics rather than metal or engineering plastics, which can be expensive and difficult to work with. By designing the valve to take into consideration the large tolerance ranges of commodity plastics, the desired performance and repeatability of the mechanism was obtained with readily available and easily worked materials.

Each of the parts which are gripped by the fingers to be moved in operation of the valve have configured surfaces. For example, hose nut 18 has spaced raised ridges 19 about its surface to facilitate gripping by the fingers. Likewise, extension nut 17 has raised ribs 21 about its surface. Locking piece 15 is slidably moved by the fingers from the locked to the unlocked position and vice versa, and has raised ridges 23 along its surface. Housing 11 also has spaced raised ribs 25 to help the user of the valve control the orientation of the valve in the user's hand. Operating handle 13 preferably does not have raised ridges along the finger grip portion in order to facilitate the sliding of the fingers as the handle is compressed toward the housing 11.

Figure 2:
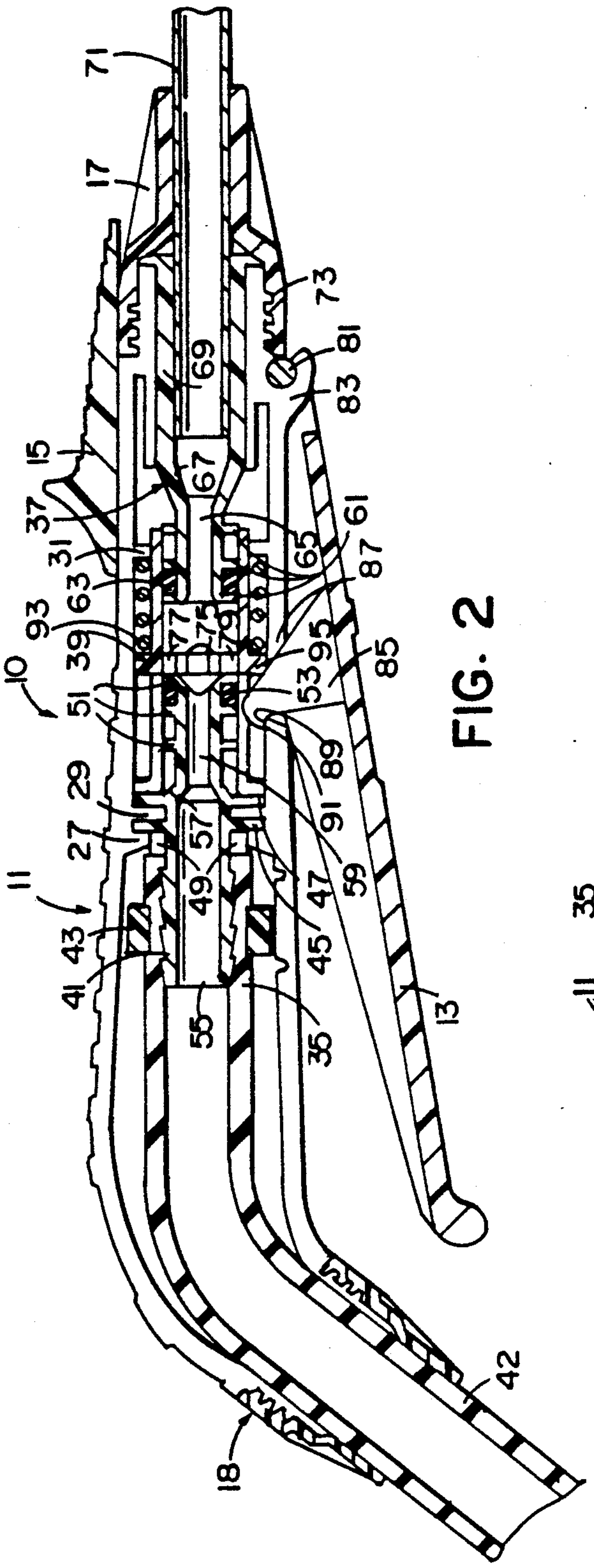
FIG. 2 is a sectional view showing the interior of the shutoff valve in the closed or off position.
Figure 5:
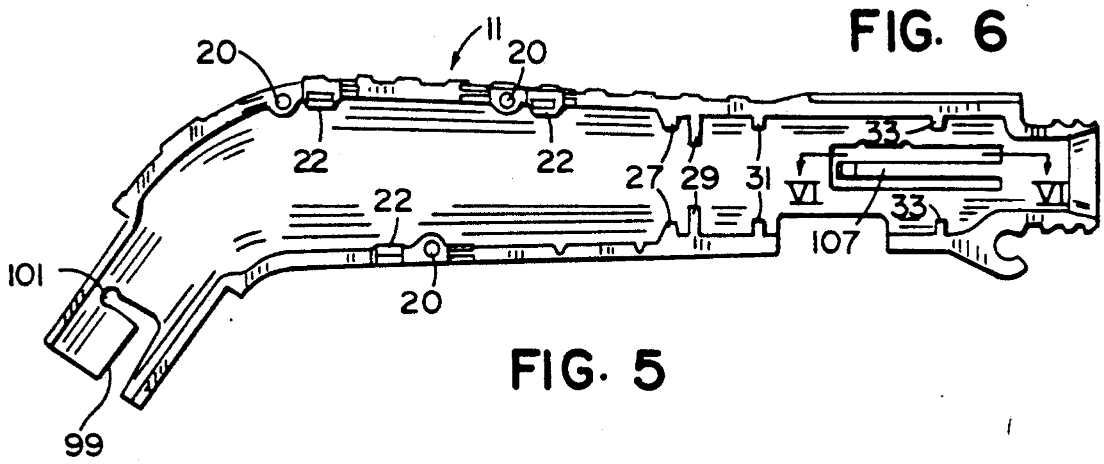
FIG. 5 is a view of the interior of the other one of the two pieces making up the housing for the valve with a path for a twist lock at the upstream end.

Valve 10 is most often in the closed position as shown in FIG. 2. Momentarily referring to FIG. 5, the interior of one-half of the housing assembly is shown. Spaced along the interior of the housing assembly are a plurality of projecting portions which would normally continue about the interior of the housing. When the two housing halves are joined together, the projections form gripping faces to circumscribe two of the three major valve components making up the shutoff valve of the present invention. The internal projections, shown top and bottom, will be given the same part number since the beginning and ending face of each projection is shown in FIG. 5. Projections 27, 29, 31 and 33 are molded on the interior of the housing when the part is formed.

Referring to FIG. 5, the inner edges of the two housing halves have spaced pins (not shown) and locating holes 20 for receiving the pins. Also, mating 22 snaps are positioned near the locating pins and locating holes with one-half of each snap being positioned opposite the other half on each side of the housing. The locating pins and mating snaps keep the two housing halves in alignment and joined together.

Figure 3:
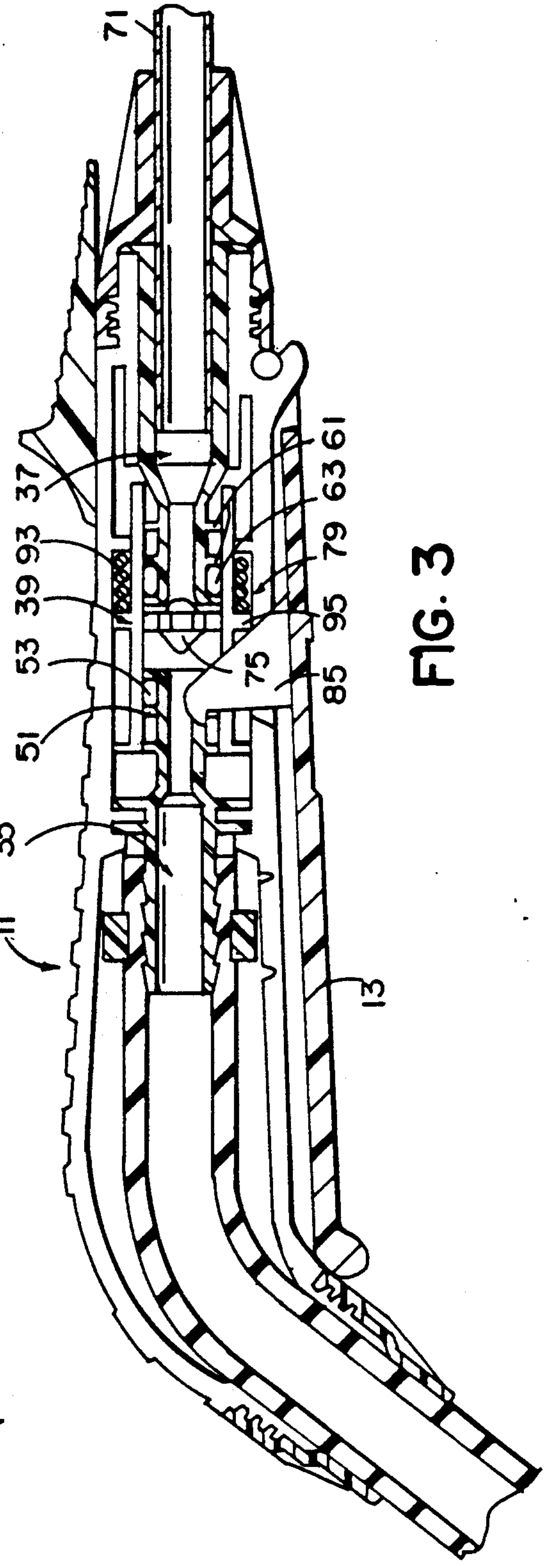
FIG. 3 is a sectional view of the shutoff valve shown in the open condition.

Within the housing are three major components making up the valve assembly, as shown in FIGS. 2 and 3. A hose insert member 35 is positioned at the upstream end of the valve assembly. A wand sleeve 37 is positioned at the downstream or outlet end of the valve assembly and a valve sleeve 39 is shown supported on the ends of hose insert 35 and the wand sleeve 37.

Hose insert member 35 has a compound configured outer surface. A barb-like surface 41 is formed where a hose 42 would be slid over the input to the hose insert. The surface 41 can have a plurality of circumferential barbs to grip the interior of the hose. A hose clamp or snap-ring 43 is used to hold the hose in place on barb-like portions 41. Interior projection portions 27 and 29 on the interior of housing 11 grip projecting portions 45 and 47 on the outer surface of hose insert 35. These portions cooperate to hold the hose insert in place in the input end of the valve assembly. Orientation faces 49 are formed on the top and bottom of the hose insert member to prevent the hose from causing the hose insert to rock up and down within the housing and to possibly break where the hose insert is gripped by the internal projections on housing 11. Along the outer surface of the exit portion of hose insert 35 are a plurality of spaced circumferential projections 51. These projections provide a guide surface for valve sleeve 39 with the space between the projections providing a space for an annular sealing member or packing member 53. The preferred packing member is an O-ring made of Buna rubber or Viton polymeric material. While only one packing member 53 is shown, space is available for a second member. Hose insert member 35 has a tubular bore 55 at the input end which steps down at a shoulder 57 to a more narrow bore 59.

Near the opposite end of the housing assembly is positioned the wand sleeve indicated generally by the number 37. Positioned on the outer surface near the input to wand sleeve 37 are a plurality of spaced circumferential projections 61. Between the spaced circumferential projecting portions is a resilient annular seal 63 which, like seal 53, is preferably an O-ring. The wand sleeve 37 has a narrow input passage 65 which expands at 67 to a tubular portion 69. The end of an extension wand 71 is shown in place within sleeve 69. The wand is held in place by extension nut 17 which is threadedly engaged at 73 to the housing 11.

Referring now to FIG. 3. valve sleeve 39 is shown supported on the circumferential projecting portions 51 of hose insert 35 and on projecting portions 61 of wand sleeve 37. O-rings 53 and 63 provide a fluid-tight seal along the inner surface of slidable valve sleeve 39 to confine the liquid to the passage through the valve.

Referring again to FIG. 2, the valve is shown in the closed position with a seal plug 75 blocking the exit of tubular passage 59. The seal plug is of a substantially conical configuration which is easily guided into the exit aperture of hose insert 35 as the valve sleeve 39 moves to close the valve. The seal plug can be made of the same types of materials used to make the annular seal members. The seal plug is supported within a seal plug frame 77 which is substantially centered within the interior of slidable valve sleeve 39. A plurality of circumferential apertures 79 are spaced about valve plug 75 to enable fluid to flow past the valve plug when the valve is opened.

Actuating handle 13 has a pivot pin 81 for supporting the handle within pivot jaw 83 on housing 11. A projection 85 extends upwardly, as shown in FIG. 2, through an aperture 87 in the bottom of the housing and contacts the sliding valve sleeve 39. It is preferred to have two spaced projecting portions on the handle to contact opposite sides of valve sleeve 39. The projecting portions are used to cam valve sleeve 39 to the open position as handle 13 is drawn toward housing 11. A spring 93 is mounted on the outer surface of valve sleeve 39 and abuts a projecting portion 95 on the exterior of the valve sleeve and a projecting portion 31 on the interior of housing 11. Spring 93 urges the valve sleeve to the closed position forcing valve plug 75 into the exit of hose insert 35. The spring also puts pressure on projection 85 of handle 13 urging the handle away from housing 11 where it is confined by face 89 on the handle and face 91 on the housing.

When it is desired to open the valve, as shown in FIG. 3, handle 13 is drawn toward housing 11 causing spaced projecting portions 85, only one of which is shown, to slide along abutment 95 on valve sleeve 39 camming the valve sleeve forward compressing spring 93 and withdrawing valve plug 75 from hose insert 35, enabling the liquid to flow from the hose through the hose insert and through the spaced circumferential apertures 79 in valve plug support frame 77. The liquid passes through the apertures in the support frame into wand sleeve 37 and then into dispensing wand 71. The rate of flow of the liquid through the valve can be controlled by the position of actuating handle 13. When it is desired to close the valve, handle member 13 can be released causing bias spring 93 to push the valve sleeve member back toward the hose insert forcing valve plug 75 into the passage 59.

Figure 4:
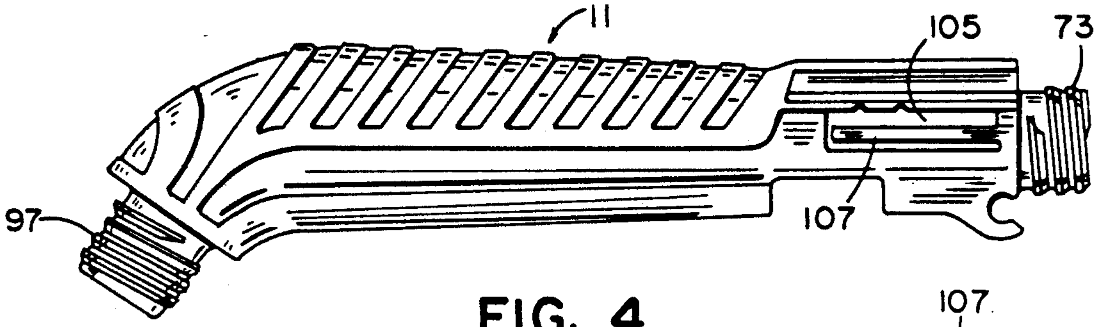
FIG. 4 is an elevational view of the outside of one of the two pieces making up the housing for the valve with a threaded portion at the upstream end.
Figure 7:
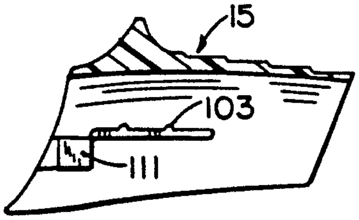
FIG. 7 is a sectional view showing the inside of the lock piece for the valve.

Referring again to FIG. 1, locking member 15 is shown disposed on the top of valve assembly 10. Locking member 15 is slidably mounted and can be actuated by the thumb for movement back and forth, or left and right, as shown in FIG. 1, to lock or open the valve, respectively. FIG. 4 shows the exterior of one-half of housing 11 which can be joined with the other half of the housing, shown in FIG. 5, to form a complete housing. It should be noted, however, that in FIG. 4 the hose nut 18 would be threadedly attached to the threaded portion 97 while in FIG. 5 a hose nut with spaced internal studs or bayonets (not shown) would join the two housing halves by cooperating with the dogleg-shaped channel 99. The projecting studs on the hose nut would be inserted into the channel 99 and then moved forward and twisted moving the studs into the portion 101 where the housing assembly and the hose nut would be locked together. When the two sides of the housing are joined together by hose nut 18, locking member 15 can be slid over the front of the housing causing projections 103 (FIG. 7) to enter into the elongated slot 105 (FIG. 4) above locking member 107. The projecting portion 103 on locking member 15 can then be moved back and forth in slot 105.

Figure 6:
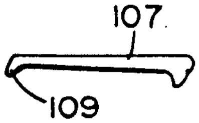
FIG. 6 is a sectional view taken on the line 6—6 of FIG. 5 showing a locking mechanism for the valve.
Figure 8:
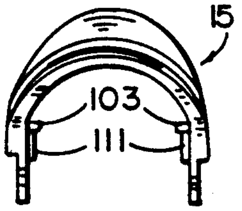
FIG. 8 is an end elevational view of the lock piece showing the lock actuating surfaces.

Locking member 107, as seen in FIG. 6, has an inner projecting portion 109 which is used to interfere with the sliding motion of valve sleeve 39. For example, when operating handle 13 is biased away from housing 11, locking member 15 can be slid to the left, as shown in the figures, to cause projecting portion 109 to abut valve sleeve 39 holding it in place in the closed position. On the other hand, when operating handle 13 is compressed and drawn toward housing 11, locking member 15 can again be slid toward the left, as shown in the figures, to cause projection 109 to grip the valve sleeve holding it in place in the open position when handle 13 is released. Locking member 15 has a camming surface 111 (FIGS. 7 and 8) which forces locking member 107 toward the interior of housing 11 when the locking member is moved to the left.

The valve assembly of the present invention can easily be disassembled for cleaning and repair by first removing extension nut 17. Pivot pin 81 can then be pressed out of the gripping jaw 83. The locking member 15 can then be removed by prying one side away from the housing 11 enough for projecting portion 103 to be free of elongated slot 105. The locking member can then be slid forward off the housing. The hose nut 18 can then be removed. The mating snaps holding the two halves of the housing together can then be released by depressing one edge of the housing along the center line. The halves of the housing will easily separate allowing access to the internal parts for cleaning and maintenance. The valve can easily be assembled by simply reversing the above procedure.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A valve for controlling the flow of a liquid comprising:

a tubular housing;

a tubular upstream input member supported in said housing and defining an inlet passage therethrough;

a tubular downstream outlet member supported in said housing defining an outlet passage therethrough and being spaced from said input member to create a space between said input and outlet members;

a valve sleeve slidably mounted on said input and outlet member;

a valve plug supported in said valve sleeve, said valve plug being aligned with said input member for closing said passage through said input member when positioned adjacent said input member;

said valve sleeve being slidable between a first position with said plug adjacent said input member, closing said input passage, and a second position in which said plug is spaced from both said input member and said outlet member, said sleeve encompassing said input and outlet members in both said first and second positions to define a fluid flow passage between said input and outlet passage in both said first and second positions and at all positions therebetween;

there being an opening between said valve plug and the interior surface of said valve sleeve whereby when said valve plug is in a position spaced from said input member and said outlet member, fluid can flow from said inlet passage, through said valve sleeve, past said valve·plug and out of said valve sleeve through said outlet passage.

2. The valve of claim 1, comprising:

an annular sealing member mounted on each of said input and outlet members;

said valve sleeve being slidably mounted in sealing engagement with said annular sealing members.

3. The valve of claim 2 including a pair of annular channels around the exterior of each of said input and outlet members, one of said annular sealing means being seated in each of said channels.

4. The valve of claim 2 including means biasing said sleeve into said first position with said valve plug closing said inlet passage.

5. The valve of claim 4 in which said biasing means comprises a spring on said valve sleeve cooperating with an internal projection on said housing to urge said valve plug and handle to the normally closed position.

6. The valve of claim 4 which includes actuating means on said housing for moving said valve sleeve from said first position to said second position.

7. The valve of claim 6 in which said actuating means comprises:

an aperture in said housing adjacent said valve sleeve;

a projection on said valve sleeve;

a handle member pivotally mounted on said housing and having an extending portion thereon for projecting through said aperture in said housing into contact with said projection on said valve sleeve.

8. The valve of claim 7 in which said bias means comprises a spring extending between a projection on said housing and said projection on said valve sleeve.

9. The valve of claim 7 in which said housing comprises first and second lateral halves which embracingly clamp said input and outlet members in place when secured together.

10. The valve of claim 1 including means biasing said sleeve into said first position with said valve plug closing said inlet passage.

11. The valve of claim 10 in which said biasing means comprises a spring on said valve sleeve cooperating with an internal projection on said housing to urge said valve plug and handle to the normally closed position.

12. The valve of claim 1 which includes actuating means on said housing for moving said valve sleeve from said first position to said second position.

13. The valve of claim 12 in which said actuating means comprises:

an aperture in said housing adjacent said valve sleeve;

a projection on said valve sleeve;

a handle member pivotally mounted on said housing and having an extending portion thereon for projecting through said aperture in said housing into contact with said projection on said valve sleeve.

14. The valve of claim 13 in which said bias means comprises a spring extending between a projection on said housing and said projection on said valve sleeve.

15. The valve of claim 1 in which said housing comprises first and second lateral halves which embracingly clamp said input and outlet members in place when secured together.

16. The combination as set forth in claim 1, including:

a slidable locking sleeve on said housing for cooperating with at least one locking finger on said housing to interfere with the motion of said valve sleeve to thereby maintain said valve in the closed or open position.

17. The combination of claim 1 including a frame mounted in said valve sleeve for supporting said valve plug, said opening between the interior of said valve sleeve and said valve plug being defined by said frame having a plurality of apertures therein to allow liquid to flow through said valve sleeve around said valve plug.

18. The combination of claim 1 wherein said input member and said outlet member are held in place in said housing by projecting portions on the inside of said housing.

19. A sprayer shutoff valve comprising:

a substantially tubular housing member having spaced internal support members and a shaped aperture in a side thereof providing access to the interior of said housing;

a tubular hose insert, said hose insert including a compound configured outer surface with a barbed portion for retaining a hose, a pair of spaced projecting portions for gripping a support member to hold said hose insert in position in said housing and a guide portion of reduced diameter with a plurality of circumferential projections for retaining an O-ring in position on the outer surface of said hose insert;

a wand sleeve comprising a tubular member having a compound configured outer surface including a tubular portion for receiving a wand, a pair of spaced circumferential projections for gripping a support member in said housing for holding said wand sleeve in position and a guide portion of reduced diameter having a plurality of circumferential projections for retaining an O-ring in position on the outer surface of said wand sleeve;

at least one O-ring mounted between a pair of said projecting portions on said hose insert and said wand sleeve;

a valve sleeve comprising an elongated tubular member having a longitudinal passage therethrough, a seal plug supporting frame generally centrally positioned in said valve sleeve orthogonal to the longitudinal passage therethrough, said seal plug supporting frame having a plurality of apertures therein and an external projecting portion substantially centrally positioned on said valve sleeve, said valve sleeve being configured to be slidably supported on said portions of reduced diameter of said hose insert and said wand sleeve;

a seal plug mounted in said seal plug supporting frame in said valve sleeve;

a control handle pivotally attached to said housing, said control handle having at least one projecting portion extending through said aperture in said housing into contact with said valve sleeve; and a spring on said valve sleeve in engagement with said projection on the outer surface of said valve sleeve and with a projection on the inside of said housing for urging said valve sleeve, said seal plug and said control handle to the normally closed position of said valve.

20. A portable valve comprising:

a housing having an axial bore therethrough, opposed spaced supports disposed on the inside of said housing projecting into said axial bore and an aperture in the wall of said housing;

a tubular hose insert mounted near one end of said housing, said hose insert having a hose gripping surface at one end and a guide surface at the opposite end;

a tubular wand sleeve mounted near the opposite end of said housing and spaced a short distance from said hose insert, said wand sleeve having a tubular portion at one end for receiving and supporting a dispensing wand and a guide surface portion at the opposite end, said hose insert and said wand sleeve being mounted in said housing spaced from one another and with said respective guide surface portions aligned;

a tubular valve sleeve slidably supported on said guide surface portions of said hose insert and said wand sleeve, said valve sleeve having an internal seal plug supporting frame therein, said seal plug supporting frame being positioned orthogonal to the tubular passage through said valve sleeve and having a plurality of apertures therein;

a seal plug mounted in said seal plug supporting frame in said valve sleeve, said seal plug being positioned to reversibly close the tubular passage in said hose insert;

a spring mounted on said valve sleeve for normally biasing said seal plug to the closed position in said hose insert;

an actuator pivotally mounted on said housing, said actuator including a projecting portion thereon for extending through said aperture in said housing to contact said valve sleeve whereby pressure on said actuator will cause said valve sleeve to withdraw said seal plug from said passage in said hose insert opening said valve.

21. A hand operated valve comprising:

an elongated tubular housing having a plurality of spaced internal projecting portions and an aperture in the wall thereof;

a tubular hose insert member supported by at least one of said plurality of internal projections in said housing, said hose insert having a portion of reduced diameter directed into said housing and a plurality of spaced circumferential projecting portions disposed on the surface of said portion of reduced diameter;

a tubular wand sleeve member supported by at least one of said plurality of internal projections in said housing, said wand sleeve having a portion of reduced diameter directed into said housing in alignment with and spaced from said portion of reduced diameter of said hose insert member and a plurality of spaced circumferential projecting portions disposed on the surface of said portion of reduced diameter;

at least one annular packing member supported on each of said insert and said wand sleeve between said spaced projections;

a tubular valve sleeve slidably supported on said portions of reduced diameter of said hose insert and said wand sleeve, said valve sleeve including a seal plug supporting frame therein, said supporting frame having a plurality of spaced apertures therein, said valve sleeve also including a projecting portion disposed on said valve sleeve;

a substantially resilient seal plug mounted in said seal plug supporting frame in said valve sleeve;

a handle member pivotally mounted on said housing, said handle member having an elongated projection thereon for extending through said aperture in said housing into operative contact with said valve sleeve;

a spring supported on said valve sleeve between said circumferential projection and an internal projection on said housing for urging said seal plug into the open end of said hose insert to close said valve.

* * * * *